United States Patent
Avasiloaie (10) Patent No.: US 9,616,854 B2
(45) Date of Patent: Apr. 11, 2017

(54) MOUNTING ASSEMBLY FOR WIPER BLADE AND WIPER ARM

(71) Applicant: TRICO PRODUCTS CORPORATION, Rochester Hills, MI (US)

(72) Inventor: Valentin Avasiloaie, Dearborn Heights, MI (US)

(73) Assignee: Trico Products Corporation, Rochester Hills, MI (US)

( * ) Notice: Subject to any disclaimer, the term of this patent is extended or adjusted under 35 U.S.C. 154(b) by 1 day.

(21) Appl. No.: 13/870,590

(22) Filed: Apr. 25, 2013

(65) Prior Publication Data

US 2014/0317874 A1    Oct. 30, 2014

(51) Int. Cl.
*B60S 1/40* (2006.01)
*B60S 1/38* (2006.01)
*B60S 1/34* (2006.01)

(52) U.S. Cl.
CPC ............. *B60S 1/387* (2013.01); *B60S 1/3867* (2013.01); *B60S 1/3427* (2013.01); *B60S 1/3468* (2013.01); *B60S 1/3865* (2013.01); *B60S 1/4003* (2013.01); *B60S 2001/4054* (2013.01)

(58) Field of Classification Search
CPC .......... B60S 1/381; B60S 1/387; B60S 1/407; B60S 1/4048; B60S 2001/4054; B60S 1/583
USPC ........................ 15/250.32, 250.351, 250.44
See application file for complete search history.

(56) References Cited

U.S. PATENT DOCUMENTS

| 2,215,371 | A | | 9/1940 | Horton |
|---|---|---|---|---|
| 3,126,216 | A | | 3/1964 | Krohm |
| 3,512,205 | A | | 5/1970 | Reister et al. |
| 3,729,767 | A | | 5/1973 | Edele et al. |
| 5,233,720 | A | | 8/1993 | Schoen |
| 5,682,639 | A | * | 11/1997 | Teindas ...................... 15/250.46 |
| 6,658,691 | B2 | | 12/2003 | Muramatsu |
| 6,665,903 | B2 | | 12/2003 | Tsukamoto et al. |
| 6,687,949 | B2 | | 2/2004 | Zimmer |
| 7,669,276 | B2 | * | 3/2010 | Verelst et al. ............. 15/250.32 |
| 8,230,546 | B2 | * | 7/2012 | Laurens et al. ............ 15/250.32 |
| 2002/0152575 | A1 | | 10/2002 | Tsukamoto et al. |

(Continued)

FOREIGN PATENT DOCUMENTS

DE    43 33 554 A1    10/1994
DE    196 23 597 A1    12/1997

(Continued)

OTHER PUBLICATIONS

Sep. 2, 2014 International Search Report and Written Opinion for PCT/US2014/034920.

*Primary Examiner* — Michael Jennings
(74) *Attorney, Agent, or Firm* — Miller Canfield (57) ABSTRACT

A mounting assembly for mounting a wiper blade to a wiper arm includes an adaptor adapted to be mounted to the wiper blade, the adaptor including a base wall and a plurality of side walls extending upwardly from the base wall, and a plurality of hinge pins extending outwardly from the side walls, and a coupler for connection to the wiper arm, the coupler including a base wall, a plurality of side walls depending from the base wall, and a plurality of openings extending into the side walls to receive the hinge pins to allow the coupler and the adaptor to be connected together.

17 Claims, 5 Drawing Sheets

(56) References Cited

U.S. PATENT DOCUMENTS

| | | |
|---|---|---|
| 2007/0136975 A1 | 6/2007 | Van De Rovaart |
| 2007/0226940 A1 | 10/2007 | Thienard |
| 2009/0199357 A1* | 8/2009 | Thienard ................. 15/250.32 |
| 2009/0282637 A1 | 11/2009 | Weber et al. |
| 2010/0024149 A1* | 2/2010 | Erdal ...................... 15/250.32 |
| 2010/0205763 A1* | 8/2010 | Ku ........................... 15/250.32 |
| 2011/0047742 A1 | 3/2011 | Kim et al. |
| 2011/0247166 A1* | 10/2011 | Depondt et al. ......... 15/250.32 |
| 2012/0110772 A1* | 5/2012 | Boland .................... 15/250.32 |
| 2012/0233801 A1* | 9/2012 | Coart et al. .............. 15/250.32 |
| 2012/0246860 A1* | 10/2012 | Schaeuble et al. ...... 15/250.32 |

FOREIGN PATENT DOCUMENTS

| | | |
|---|---|---|
| DE | 196 53 033 A1 | 6/1998 |
| DE | 102 17 600 A1 | 11/2002 |
| DE | 10 2004 017 447 A1 | 11/2005 |
| DE | 10 2008 034 373 A1 | 2/2010 |
| EP | 0 753 439 A1 | 1/1997 |
| EP | 1 800 977 A2 | 11/2006 |
| EP | 1876073 A1 * | 1/2008 |
| FR | 2 543 897 | 10/1984 |
| FR | 2 746 740 | 10/1997 |
| FR | 2 746 750 | 10/1997 |
| FR | 2 774 050 | 3/1999 |
| GB | 642188 | 8/1950 |
| GB | 756229 | 9/1956 |
| GB | 1 435 778 | 5/1976 |
| JP | 2000 95070 | 4/2000 |
| JP | 2000-255387 A | 9/2000 |
| JP | 2001 247015 | 9/2001 |
| JP | 2001 301580 | 10/2001 |
| JP | 2002 120696 | 4/2002 |
| JP | 2006 76522 | 3/2006 |
| JP | 2006 76523 | 3/2006 |
| JP | 2006 213325 | 8/2006 |
| JP | 2006 248329 | 9/2006 |
| JP | 2006 281954 | 10/2006 |
| JP | 2006 298146 | 11/2006 |
| JP | 2006 298278 | 11/2006 |
| JP | 2007 153152 | 6/2007 |
| JP | 2007 153153 | 6/2007 |
| JP | 2008 94376 | 4/2008 |
| JP | 2008 168831 | 7/2008 |
| WO | WO 2012014054 * | 2/2012 |
| WO | WO2012055746 * | 5/2012 |

* cited by examiner

MOUNTING ASSEMBLY FOR WIPER BLADE AND WIPER ARM

BACKGROUND OF THE INVENTION

1. Field of the Invention

The present invention relates generally to wiper systems for vehicles and, more specifically, to a mounting assembly for mounting a wiper blade to a wiper arm for a wiper system of a vehicle.

2. Description of the Related Art

Conventional wiper systems known in the related art include some type of wiper assembly (hereinafter referred to as a "wiper blade") mounted to a wiper arm assembly (hereinafter referred to as a "wiper arm"), which, in turn, is mounted adjacent to a surface to be wiped, such as a windshield. The wiper arm is pivotally driven to impart reciprocal motion to the wiper blade across the windshield. The wiper blade includes a wiping element that contacts the windshield across the surface to be wiped. The wiper blade is commonly either of the "tournament" or "beam blade" type. Both types of wiper blades commonly known in the related art typically incorporate one or more metal strips that act to reinforce the wiping element and facilitate wiping contact by the wiping element across what is typically a curved surface. In this context, the wiper arm delivers a downward force to the wiper blade that is distributed thereacross, pressing the wiping element into contact with the surface to be wiped.

While such wiper systems known in the related art have generally worked for their intended purposes, some deficiencies still remain. In a rear wiper blade application, one type of wiper blade is mounted to one type of wiper arm. This requires many different types of wiper blades for many different vehicles. As such, there are multiple wiper blades for each vehicle model, which is undesired.

Thus, there remains a need in the art for one wiper blade to fit multiple vehicles. There is also a need in the art for a mounting assembly to allow replacement of rear blades on various vehicles.

SUMMARY OF THE INVENTION

The present invention overcomes many limitations and disadvantages in the related art in a mounting assembly for mounting a wiper blade to a wiper arm. The mounting assembly includes an adaptor adapted to be mounted to the wiper blade. The adaptor includes a base wall and a plurality of side walls extending upwardly from the base wall, and a plurality of hinge pins extending outwardly from the side walls. The mounting assembly also includes a coupler for connection to the wiper arm, the coupler including a base portion comprising a base wall, a plurality of side walls depending from the base wall, and a plurality of inwardly facing openings extending into the side walls to receive the hinge pins to allow the coupler and the adaptor to be connected together.

In this way, the mounting assembly of the present invention is used in rear blade applications to allow the same type of wiper blade to be used on various vehicles using different adaptors. The mounting assembly of the present invention combines a connector or coupler feature with an adaptor feature, allowing the same wiper blade to be used in multiple applications using different couplers. The mounting assembly of the present invention provides for one wiper blade to fit multiple vehicles.

Other objects, features, and advantages of the present invention will be readily appreciated as the same becomes better understood after reading the subsequent description taken in connection with the accompanying drawings.

DESCRIPTION OF THE PREFERRED EMBODIMENT(S)

Figure 1:
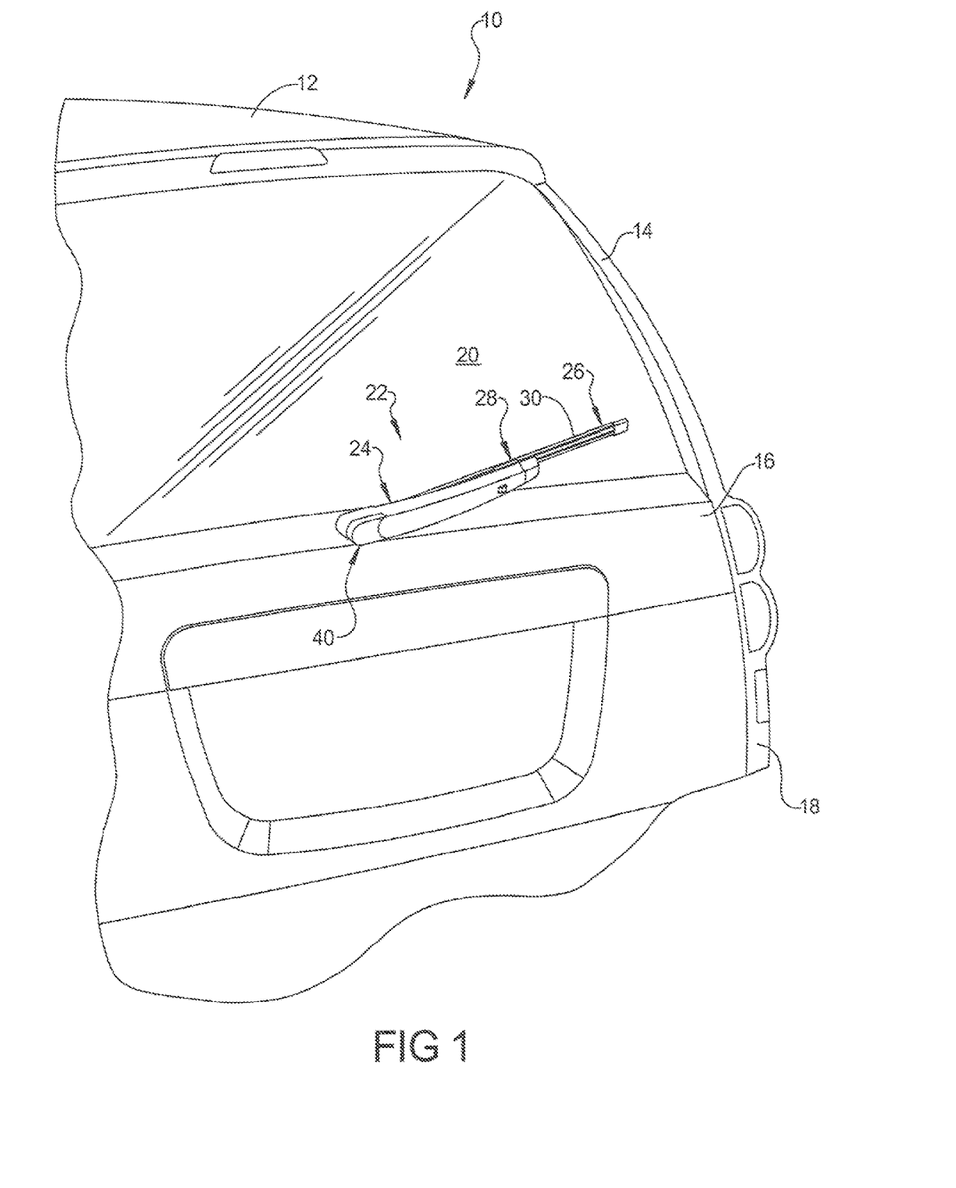
FIG. 1 is a partial perspective view of a rear of a vehicle having a wiper system incorporating a mounting assembly according to the present invention.

Referring now to the figures, where like numerals are used to designate like structure, a portion of a vehicle is schematically illustrated at 10 in FIG. 1. More specifically, the portion of the vehicle 10 that has been employed, to illustrate the present invention includes a generic illustration of a rear of a vehicle. Thus, the vehicle 10 includes a roof 12, a pair of pillars 14 (only one of which is shown in FIG. 1), a lift gate 16, and a rear 18 of the vehicle 10. A glass rear window 20 extends between the pillars 14 on the lift gate 16. While the rear of the vehicle 10 illustrated herein employs a lift gate 16, those having ordinary skill in the art will appreciate from the description that follows that the vehicle 10 could include a hatch back or any other commonly known configuration without departing from the scope of the present invention.

A wiper system is generally shown at 22 in FIG. 1 and in the embodiment illustrated herein, is employed, to clean the rear window 20. The wiper system 22, includes a wiper arm assembly, generally indicated at 24, (hereinafter referred to as a "wiper arm"), and a wiper assembly, generally indicated at 26, (hereinafter referred to as a "wiper blade"). In the embodiment illustrated herein, the wiper arm 24 is operatively mounted to the lift gate 16 and is moveable in an oscillating fashion to move the wiper blade 26 across the rear window 20. The wiper blade 26 is releasably engaged to the wiper arm 24 via a mounting assembly, according to the present invention and generally indicated at 28, that operatively interconnects the wiper blade 26 and wiper arm 24. The wiper blade 26 is adapted to clean the surface to be wiped, in this case, the rear window 20. It should be appreciated by those having ordinary skill in the art that the wiper system 22 may include other components besides the wiper arm 24 and wiper blade 26. Furthermore, it should be appreciated by those having ordinary skill in the art that the wiper arm 24 and wiper blade 26 may be employed in other areas of the vehicle 10, such as a front windshield (not shown) or a head lamp (not shown) that employs a wiper system. Thus, it will be understood that the present invention is not limited for use solely in connection with wiper arms 24 adjacent to a vehicle's rear window 20, but for use in all applications where wiper blades 26 are employed.

Figure 2:
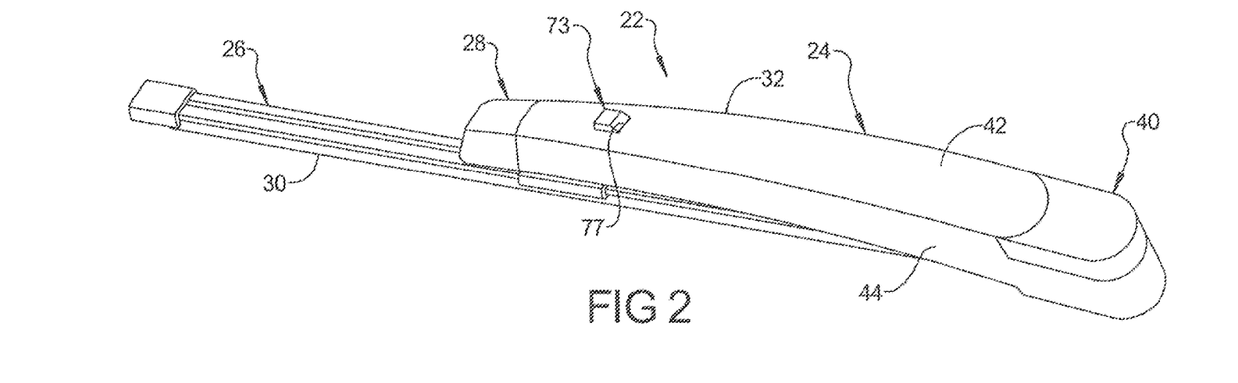
FIG. 2 is a perspective view of a portion of the wiper system incorporating the mounting assembly of the present invention of FIG. 1.

Referring to FIGS. 1 and 2, the wiper blade 26 includes a wiping element 30 that has a predetermined length and cross-sectional profile corresponding to a particular application and is typically manufactured through an extrusion process, which enables the length and cross-sectional profile of the wiping element 30 to be easily adjusted without a substantial increase to manufacturing expense. Furthermore, the wiping element 30 is constructed from a flexible rubber. It should be appreciated by those having ordinary skill in the art that the wiping element 30 may be constructed from any flexible material, such as silicone or other polymer, and via any manufacturing process, such as injecting molding, without departing from the scope of the present invention.

Those having ordinary skill in the art will also appreciate that the wiper blade 26 may be of either the tournament or beam blade type having any standard construction as is commonly known in the art. Thus, whether the wiper blade 26 is a tournament or beam style blade, it will generally distribute downward pressure from the wiper arm 24 across the wiping element 30. Moreover, the wiper blade 26 may be curved longitudinally with a predetermined radius of curvature that is the same or greater than the plane of curvature of the rear window 20, if any. This predetermined radius of curvature is sometimes referred to in the related art as a "free form" radius of curvature (hereinafter "windshield curvature"). Accordingly, the curvature of the wiper blade 26 may be symmetrical or asymmetrical depending on the force requirements and the contour of the surface to be wiped. The flexible, free form, pre-curved wiper blade 26 straightens out when the wiper arm 24 applies a force thereto to flatten it and direct the wiping element 30 to contact the surface to be wiped. Thus, the wiper blade 26 may include a free-form curvature that ensures force distribution on rear windows 20 or windshields having various curvatures that effects proper wrapping about the surface to be wiped. The wiper blade 26 may also include an airfoil (not shown) to reduce the likelihood of wind lift during operational movement across the surface to be wiped. However, it should be appreciated by those having ordinary skill in the art that the airfoil is optional, especially where the wiper blade 26 is employed on the rear window 20.

Figure 3:
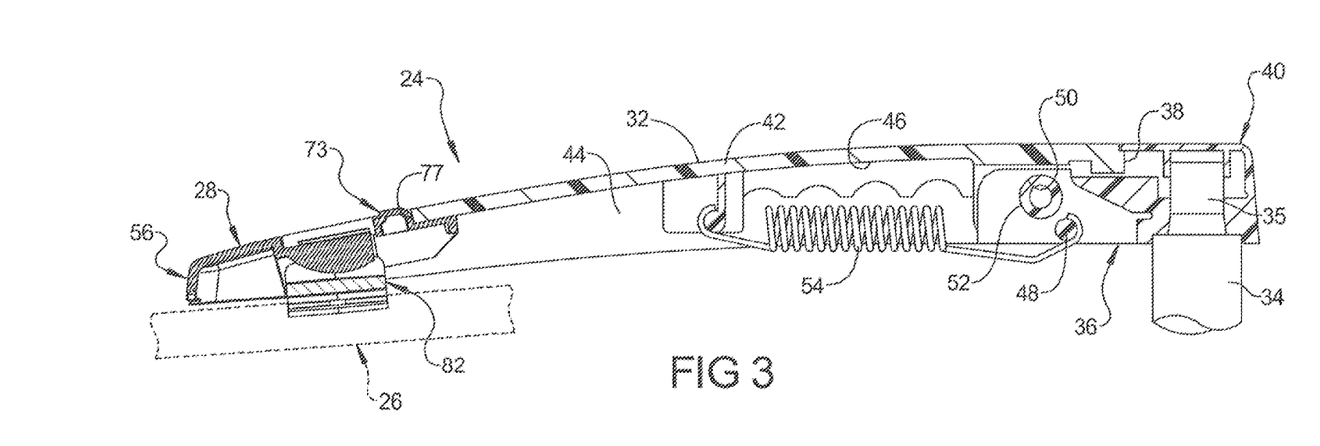
FIG. 3 is a cross-sectional side view of the portion of the wiper system incorporating the mounting assembly of the present invention of FIG. 2.

Referring to FIGS. 1 through 3, the wiper arm 24 includes an elongated body 32 operatively mounted to a pivot shaft 34, which, in turn, is driven by an electrical motor (not shown) either directly or through appropriate linkages as is commonly known in the art. To this end, the wiper arm 24 includes a head, generally indicated at 36, that is supported on the body 32 and adapted to be mounted to the pivot shaft 34 and drives the wiper blade 26 in an oscillating manner across the surface to be wiped. The head 36 is operatively mounted to the pivot shaft 34 via a nut 35 threaded onto the distal end of the pivot shall 34 or via any suitable fastener known in the related art. The wiper arm 24 includes an opening 38 in the body 32 that provides access to the head 36 and to the pivot shaft 34. The wiper arm 24 also includes a cover, generally indicated at 40, mounted to the body 32 at the opening 38 and is movable from a first position closing the opening 38 to a second position allowing access to the head 36 and the pivot shaft 34 via the opening 38.

As illustrated in FIGS. 2 and 3, the body 32 has a top wall 42 and side walls 44 depending from the top wall 42 so as to define an inversely open ended U-shape with an interior cavity 46. The head 36 is operatively supported by the body 32 in the interior cavity 46. To this end, the body 32 may include a pair of opposed bosses 48 formed on the interior cavity 46 opposite one another and that present a pair of inwardly facing openings 50. The head 36 may employ a pair of bearings 52 that are cooperatively received in the inwardly facing, openings 50 such that the head 36 and body 32 may pivot relative to each other about an axis defined by the bearings 52. The wiper arm 24 may include a biasing member 54, such as a coiled spring, disposed in the interior cavity 46 of the body 32 and operatively connected between the head 36 and the body 32 as is commonly known in the art. It should be appreciated that the biasing member 54 generates a downward force on the wiper blade 26 as it oscillates across the surface to be wiped.

The inwardly facing openings 50 open in a direction that is below an imaginary horizontal line extending through the center of the bearings 52. The bearings 52 are disposed in sliding engagement with the opposed bosses 48. The downwardly angled inwardly facing openings 50 of the bearings 48 essentially capture the head 36 during assembly under the force provided by the biasing member 54. At the same time this interaction allows rotation between the body 32 and the head 36. Moreover, the interaction of the bosses 48 with the bearings 52 functions as a bearingless joint between the body 32 and the head 36. Thus, the biasing member 54 retains the body 32 relative to the head 36 during use without the need of a rivet. The top wall 42 and sidewalls 44 of the body 32 essentially envelopes the arm/head joint from both sides as well as from the top. This arrangement offers protection from snow and ice buildup that commonly causes conventional wiper arms to freeze during wintery weather conditions causing loss of arm load resulting in poor wipe quality. The internal joint formed between the opposed bosses 4 and the bearings 52 also offer superior serviceability by allowing the body 32 to be rotated about the axes defined between the bosses 48 and bearings 52 while maintaining excellent lateral strength. In addition, the operative interaction between the head 36 and body 32 requires no tools or fastening mechanisms and all components can be assembled by hand. Thus, the operation of the body 32 relative to the head 36 effectively lowers the cost of the joint formed therebetween.

Referring now to FIGS. 2 through 6, one embodiment of the mounting assembly 28 is shown. The mounting assembly 28 includes a coupler, generally indicated at 56, for connection to the body 32 of the wiper arm 24. The coupler 56 includes an end portion 57 having a top wall 58, side walls 60, and end walls 62 depending therefrom. The coupler 56 also includes a base portion 63 extending axially from one of the end walls 62 and having a base wall 64 and side walls 66 depending therefrom. The base portion 63 includes chamfered walls 68 interconnecting the base wall 64 and side wall 66 and extending at an angle thereto to allow the base portion 63 to be inserted into the cavity 46 of the body 32 of the wiper arm 24. The base portion 63 includes at least one or more raised portions 70 extending outwardly from the side walls 66 to allow the side walls 66 to frictionally engage the side walls 44 of the body 32 and prevent the coupler 56 from being dislodged from the body 32 of the wiper arm 24. The base portion 63 also includes present a pair of recesses or openings 71 extending upwardly into the side walls 66. The openings 71 have a general "keyhole" shape with an arcuate portion and a tapered entry portion to receive hinge pins 88 of an adaptor 82 to be described.

Figure 4:
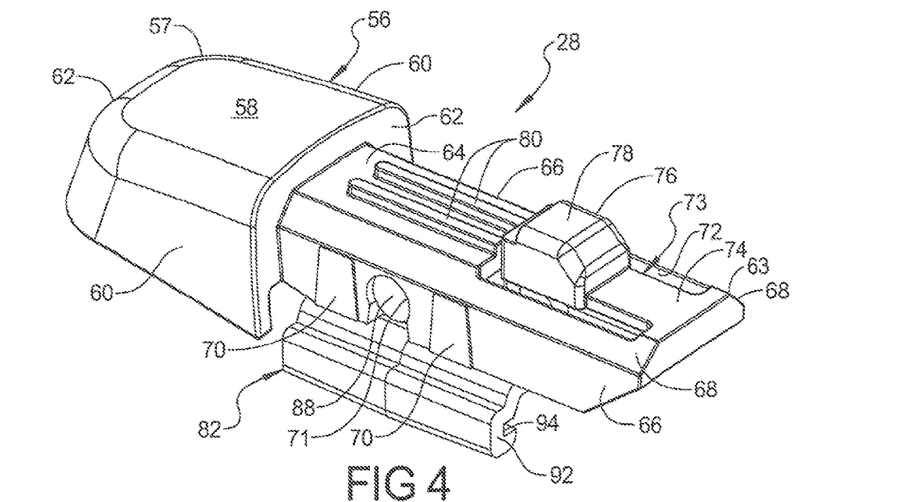
FIG. 4 is a perspective view of one embodiment of the mounting assembly of the present invention of FIG. 2.
Figure 5:
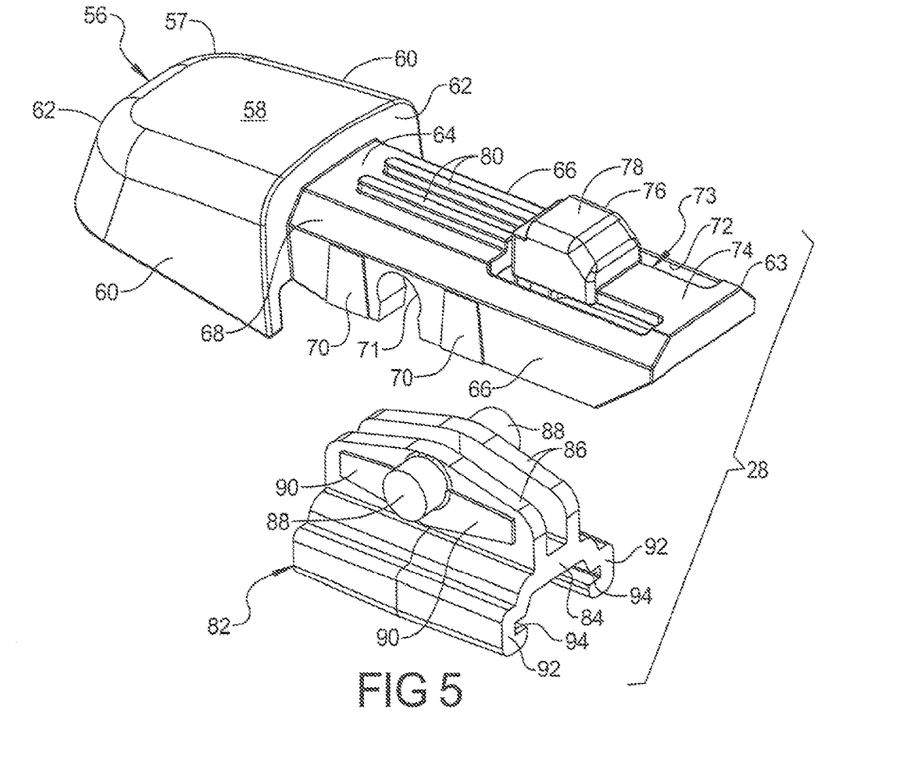
FIG. 5 is an exploded perspective view of the mounting assembly of the present invention of FIG. 4.
Figure 6:
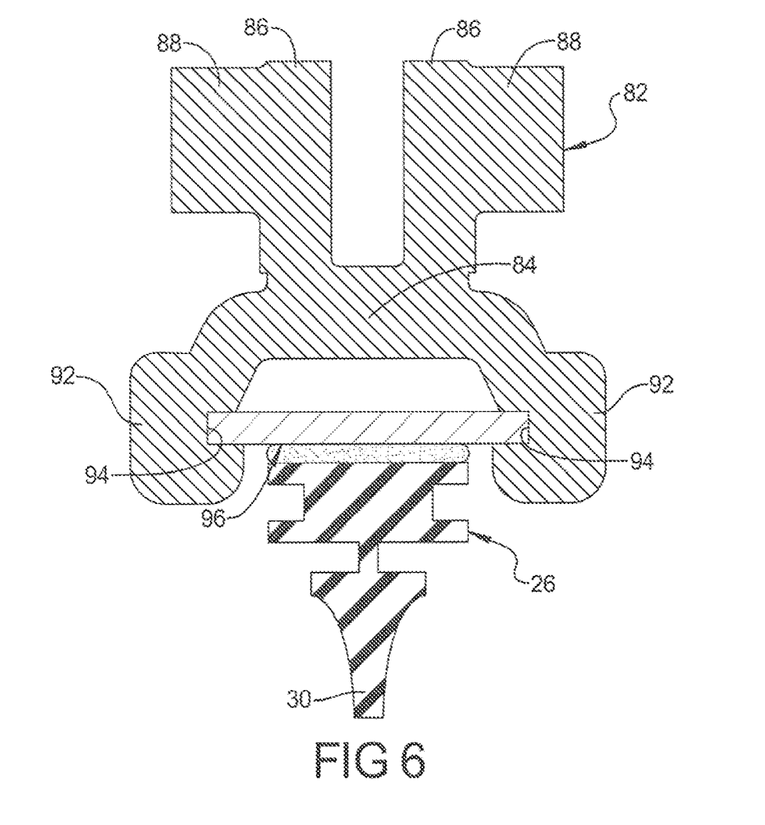
FIG. 6 is a sectional view of the mounting assembly of the present invention of FIG. 4.

The base portion 63 also includes aperture 72 extending through the base wall 64. The base portion 63 further includes an engaging member, generally indicated at 73, disposed within the aperture 71. The engaging member 73 depends from the base wall 64 and includes a cantilevered body 74 and a head 76 disposed at the terminal end of the cantilevered body 74 that cooperates with the body 32 of the wiper arm 24. The engaging member 73 includes a raised portion or retention tab 78 on the head 76 that is adapted to be disposed in a corresponding aperture 77 of the body 32 of the arm portion 24. The base portion 63 also includes one or more raised strips 80 that provide an interference fit with the body 32 of the wiper arm 24. The coupler 56 is a made of a material such as plastic. The coupler 56 is integral, unitary, and one-piece.

The mounting assembly 28 also includes an adaptor, generally indicated at 82, that cooperates with the coupler 56. The adaptor 82 includes a base wall 84 and a plurality such as a pair of side walls 86 extending upwardly from the base wall 84 to form a general "U" shape configuration. The adaptor 82 also includes a plurality of hinge pins 88 with one hinge pin 88 extending outwardly from each of the side walls 86 and opposing each other. The hinge pins 88 are generally cylindrical in shape and have a generally circular cross-sectional shape. The adaptor $2 includes one or more raised portions 90 extending outwardly from the side walls 86 to frictionally engage the side walls 66 of the base portion 63 of the coupler 56.

The adaptor 82 also includes a plurality of channel walls 92 extending from the base wall 84 and forming grooves 94 to receive a support structure such as a beam 96 of the wiper blade 26 as rated in FIG. 6. The channel walls 92 are generally "C" shaped in cross-section and extend longitudinally. The adaptor 82 is a made of a material such as plastic. The adaptor 82 is integral, unitary, and one-piece.

In its operative mode, the mounting assembly 28 has its adaptor 82 secured to the wiper blade 26 such that the beam 96 disposed in the grooves 94. The coupler 56 has its openings 71 of the base portion 63 snapped onto the hinge pins 88 extending outwardly from each of the side walls 86 of the adaptor 82. The base portion 63 is slid into an opening at the end of the cavity 46 of the body 32 of the wiper arm 24 and the engaging member 73 has the retention tab 78 disposed in the corresponding aperture 77 of the body 32 of the wiper arm 24.

For releasable engagement of the mounting assembly 28 with the wiper arm 24, the retention tab 78 is moved downwardly into the cavity 46 of the body 32 of the wiper arm 24. The coupler 56 has its base portion 63 slid away from the body 32 of the wiper arm 24, thereby releasing the mounting assembly 28 from the wiper arm 24. The mounting assembly 28 can have the coupler 56 moved away from the adaptor 82 such that the hinge pins 88 disengage the openings 71 of the base portion 63. The adaptor 82 is then unsecured from the wiper blade 26 by removing the beam 96 of the wiper blade 26 from the grooves 94 of the adaptor 82.

Figure 7:
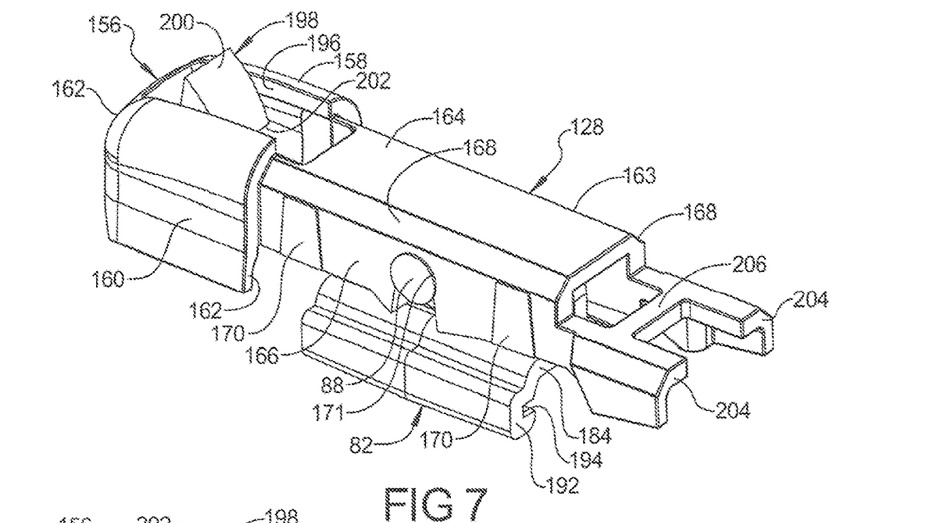
FIG. 7 is a perspective view of another embodiment, according to the present invention, of the mounting assembly of the present invention of FIG. 2.
Figure 8:
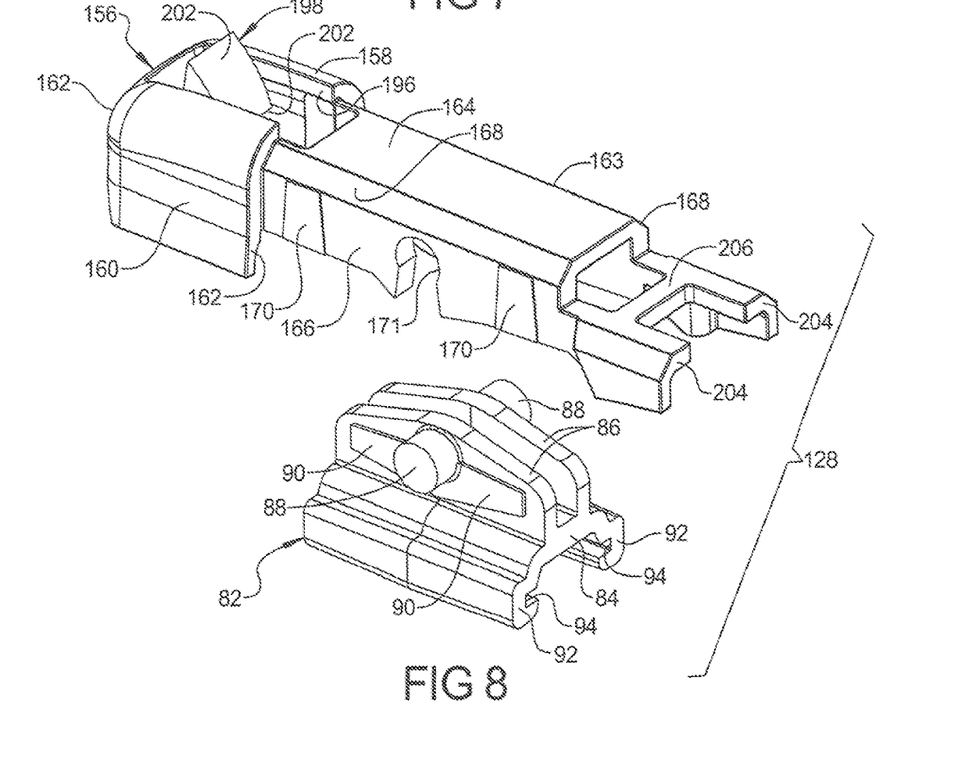
FIG. 8 is an exploded perspective view of the mounting assembly of the present invention of FIG. 7.

Referring to FIGS. 7 and 8, another embodiment, according to the present invention, of the mounting assembly 28 is shown. Like parts of the mounting assembly 28 have like reference numerals increased, by one hundred (100). In this embodiment, the mounting assembly 128 includes a coupler, generally indicated at 156, for connection to the body 32 of the wiper arm 24. The coupler 156 also includes an end portion 157 having a top wall 158, side walls 160, and end walls 162 depending therefrom. The coupler 156 includes an aperture 196 extending through the top wall 158. The coupler 156 includes an engaging member or snap bridge, generally indicated at 198, that is disposed within the aperture 196. The snap bridge 198 depends from the end portion 157 and includes a cantilevered body (not shown) and a head 200 disposed at the terminal end of the cantilevered body. The head 200 also includes a lip 202 depending therefrom. The lip 202 is adapted to receive a portion of a bent tab (not shown) of the wiper arm 24 to prevent undesired release of the coupler 156 from the wiper arm 24. More specifically, the lip 202 provides an interference fit between a portion of the bent tab and the snap bridge 198.

The coupler 156 also includes a base portion 163 extending axially from one of the end walls 162 and having a base wall 164 and side walls 166 depending therefrom. The base portion 163 includes chamfered walls 168 interconnecting the base wall 164 and side wall 166 and extending at an angle thereto to allow the base portion 163 to be inserted into the cavity 46 of the body 32 of the wiper arm 24. The base portion 163 includes at least one or Ore raised portions 170 extending outwardly from the side walls 166 to allow the side walls 166 to frictionally engage the side walls 44 of the body 32 of the wiper arm 24 and prevent the coupler 156 from being dislodged from the body 32 of the wiper arm 24. The base portion 163 also includes present a pair of openings 171 extending upwardly into the side walls 166 to receive the hinge pins 88 of the adaptor 82.

The coupler 156 is thither defined by a flange 204 that extends longitudinally outward beyond the base portion 163 to provide releasable engagement with the wiper arm 24. The coupler 156 also includes a lock bridge 206 extending between the flanges 204. The lock bridge 206 extends laterally between the flanges 204 to facilitate the releasable engagement with the wiper arm 24. It will be appreciated that the flanges 204 provide an interference fit with the body 32 of the wiper arm 24.

The mounting assembly 128 also includes the adaptor, generally indicated at 82, that cooperates with the coupler 156. The adaptor 82 is the same as that shown and described in connection with FIGS. 4 through 6. It should be appreciated that the adaptor 82 can be used with various couplers 56, 156 and its connection to the wiper blade 26 is the same.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A mounting assembly for mounting a wiper blade to a wiper arm, said mounting assembly comprising:
   an adaptor adapted to be mounted to the wiper blade, said adaptor including a base wall and a plurality of side walls extending upwardly from said base wall, and a plurality of hinge pins extending outwardly from said side walls; and
   a coupler for connection to the wiper arm, said coupler including a base wall, a plurality of side walls depending from said base wall, and a plurality of openings extending into said side walls to receive said hinge pins to allow said coupler and said adaptor to be connected together;
   wherein said coupler further includes an aperture extending therethrough, an engaging member disposed in said aperture that cooperates with the wiper arm for releasably engaging the wiper arm, an end portion extending longitudinally from said base wall and said side walls to define an end wall, and at least one raised strip extending longitudinally from said base wall and spaced longitudinally between said aperture and said end wall for abutting the wiper arm;

wherein said engaging member includes a cantilevered body and a head disposed at a terminal end of said cantilevered body that cooperates with the wiper arm, and wherein said head includes a raised portion with filleted edges and a ramp, said ramp facing away from said terminal end for cooperating with the wiper arm to move said engaging member downwardly until said engaging member releasably engages the wiper arm.

2. A mounting assembly as set forth in claim 1, wherein said adaptor includes a plurality of channel walls extending from said base wall and forming grooves adapted to receive a support structure of the wiper blade.

3. A mounting assembly as set forth in claim 1 wherein said engaging member includes a retention tab that is adapted to be disposed in a corresponding aperture of the wiper arm.

4. A mounting assembly as set forth in claim 1 wherein said coupler includes chamfered walls interconnecting said base wall and said side walls and extending at a reflex angle thereto to allow said coupler to be inserted into the wiper arm.

5. A wiper system as set forth in claim 4 wherein said end wall of said coupler is perpendicular to each of said chamfered walls of said coupler.

6. A mounting assembly as set forth in claim 1 wherein said wiper includes at least one raised portion extending outwardly from each of said side walls to allow said side walls to frictionally engage the wiper arm and prevent said coupler from being dislodged from the wiper arm.

7. A wiper system as set forth in claim 1 wherein said raised strip extends longitudinally from said aperture.

8. A wiper system as set forth in claim 1 wherein said aperture is defined in said base wall of said coupler.

9. A wiper system as set forth in claim 1 wherein said end wall of said coupler is perpendicular to each of said base wall and said side walls of said coupler.

10. A wiper system for a vehicle comprising:
a wiper blade adapted to contact a surface to be wiped, a wiper arm adapted to support said wiper blade as it moves across a surface to be wiped, and a mounting assembly that operatively interconnects said wiper blade and said wiper arm; and said mounting assembly including an adaptor mounted to said wiper blade, said adaptor including a base wall and a plurality of side walls extending upwardly from said base wall, and a plurality of hinge pins extending outwardly from said side walls, and a coupler connected to said wiper arm, said coupler including a base wall, a plurality of side walls depending from said base wall, and a plurality of openings extending into said side walls to receive said hinge pins to allow said coupler and said adaptor to be connected together;

wherein said coupler further includes an aperture extending therethrough, an engaging member disposed in said aperture that cooperates with said wiper arm for releasably engaging said wiper arm, and an end portion extending longitudinally from said base wall and said side walls to define an end wall, and at least one raised strip extending longitudinally from said base wall and spaced longitudinally between said aperture and said end wall for abutting said wiper arm;

wherein said engaging member includes a cantilevered body and a head disposed at a terminal end of said cantilevered body that cooperates with the wiper arm, and wherein said head includes a raised portion with filleted edges and a ramp, said ramp facing away from said terminal end for cooperating with the wiper arm to move said engaging member downwardly until said engaging member releasably engages the wiper arm.

11. A wiper system as set forth in claim 10 wherein said adaptor includes a plurality of channel walls extending from said base wall and forming grooves adapted to receive a support structure of said wiper blade.

12. A wiper system as set forth in claim 10 wherein said coupler includes chamfered walls interconnecting said base wall and said side walls and extending at a reflex angle thereto to allow said coupler to be inserted into said wiper arm.

13. A wiper system as set forth in claim 12 wherein said end wall of said coupler is perpendicular to each of said chamfered walls of said coupler.

14. A wiper system as set forth in claim 10 wherein said base portion includes at least one raised portion extending outwardly from each of said side walls to allow said side walls to frictionally engage said wiper arm and prevent said coupler from being dislodged from said wiper arm.

15. A wiper system as set forth in claim 10 wherein said raised strip extends longitudinally from said aperture.

16. A wiper system as set forth in claim 10 wherein said aperture is defined in said base wall of said coupler.

17. A wiper system as set forth in claim 10 wherein said end wall of said coupler is perpendicular to each of said side walls of said coupler.

* * * * *